(12) United States Patent
Kim et al.

(10) Patent No.: US 11,929,495 B2
(45) Date of Patent: Mar. 12, 2024

(54) ANODE FOR LITHIUM SECONDARY BATTERY AND LITHIUM SECONDARY BATTERY INCLUDING THE SAME

(71) Applicant: SK On Co., Ltd., Seoul (KR)

(72) Inventors: Hyo Mi Kim, Daejeon (KR); Moon Sung Kim, Daejeon (KR); Sang Baek Ryu, Daejeon (KR); Da Hye Park, Daejeon (KR); Seung Hyun Yook, Daejeon (KR); Hwan Ho Jang, Daejeon (KR); Kwang Ho Jeong, Daejeon (KR); Da Bin Chung, Daejeon (KR); Jun Hee Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/319,931

(22) Filed: May 18, 2023

(65) Prior Publication Data
US 2023/0378446 A1   Nov. 23, 2023

(30) Foreign Application Priority Data

May 18, 2022   (KR) ........................ 10-2022-0060746

(51) Int. Cl.
*H01M 4/38*   (2006.01)
*H01M 4/133*   (2010.01)
(Continued)

(52) U.S. Cl.
CPC ........... *H01M 4/366* (2013.01); *H01M 4/133* (2013.01); *H01M 4/134* (2013.01); *H01M 4/386* (2013.01);
(Continued)

(58) Field of Classification Search
CPC ...... H01M 4/366; H01M 4/133; H01M 4/134; H01M 4/386; H01M 4/587; H01M 4/622; H01M 10/0525; H01M 2004/027
See application file for complete search history.

(56) References Cited

U.S. PATENT DOCUMENTS

2010/0285356 A1   11/2010   Choi et al.
2015/0280221 A1   10/2015   Abdelsalam et al.
(Continued)

FOREIGN PATENT DOCUMENTS

KR        101223622 B1     1/2013
KR   10-2015-0086288 A     7/2015
(Continued)

OTHER PUBLICATIONS

Extended European Search Report for the European Patent Application No. 23173891.5 issued by the European Patent Office dated Nov. 2, 2023.

*Primary Examiner* — Cynthia K Walls
(74) *Attorney, Agent, or Firm* — IP & T GROUP LLP (57) ABSTRACT

In some implementations, the anode includes a current collector, a first anode mixture layer formed on at least one surface of the current collector, and a second anode mixture layer formed on the first anode mixture layer. The first anode mixture layer and the second anode mixture layer include a carbon-based active material, respectively. The first anode mixture layer includes a first binder, a first silicon-based active material, and a first conductive material. The second anode mixture layer includes a second binder, a second silicon-based active material, and a second conductive material. Contents of the first conductive material and the second conductive material are different from each other with respect to the total combined weight of the first anode mixture layer and the second anode mixture layer. Types of (Continued)

the first silicon-based active material and the second silicon-based active material are different from each other.

15 Claims, 1 Drawing Sheet

(51) Int. Cl.
    *H01M 4/134*     (2010.01)
    *H01M 4/36*     (2006.01)
    *H01M 4/587*     (2010.01)
    *H01M 4/62*     (2006.01)
    *H01M 10/0525*     (2010.01)
    *H01M 4/02*     (2006.01)

(52) U.S. Cl.
    CPC ........... *H01M 4/587* (2013.01); *H01M 4/622* (2013.01); *H01M 10/0525* (2013.01); *H01M 2004/027* (2013.01)

(56) References Cited

U.S. PATENT DOCUMENTS

| 2020/0335795 A1* | 10/2020 | Cha ............... H01M 4/0404 |
| 2020/0403231 A1 | 12/2020 | Kim et al. |
| 2021/0119200 A1 | 4/2021 | Nam |
| 2021/0234191 A1 | 7/2021 | Lee et al. |
| 2022/0123289 A1 | 4/2022 | Bae et al. |
| 2022/0310991 A1* | 9/2022 | Lee ............... H01M 4/625 |

FOREIGN PATENT DOCUMENTS

| KR | 10-2019-0064480 A | 6/2019 |
| KR | 10-2020-0038168 A | 4/2020 |
| WO | 2019167613 A1 | 9/2019 |

* cited by examiner

ANODE FOR LITHIUM SECONDARY BATTERY AND LITHIUM SECONDARY BATTERY INCLUDING THE SAME

CROSS-REFERENCE TO RELATED APPLICATION(S)

This patent document claims the priority and benefits of Korean Patent Application No. 10-2022-0060746 filed on May 18, 2022, the disclosure of which is incorporated herein by reference in its entirety.

TECHNICAL FIELD

The technology and implementations disclosed in this patent document generally relate to an anode for a secondary battery and a lithium-ion secondary battery including the same, and more particularly, to a high-capacity multilayer anode for a secondary battery having excellent lifespan characteristics, and a lithium-ion secondary battery including the same.

BACKGROUND

Recently, with the growing interest in the environmental issues, a large amount of research has been conducted on electric vehicles (EVs) and hybrid electric vehicles (HEVs) capable of replacing vehicles using fossil fuels, such as gasoline and diesel vehicles, one of the main causes of air pollution.

Lithium-ion secondary batteries having high discharge voltage and output stability have been mainly used as power sources for such EVs and HEVs. In addition, with an increase in need for high-energy secondary batteries having high energy density, the development and research of high-capacity anodes for such batteries have also been actively conducted.

Recently, in order to implement secondary batteries having high capacity and high energy density, silicon-based active materials, having high discharge capacity compared to graphite, have been applied to anodes for secondary batteries. However, the silicon-based active materials have large volume expansion rate compared to graphite and cause relatively large contraction/expansion during a repeated charging/discharging process of a battery, resulting in deintercalation of an active material layer, an increase in internal resistance of an electrode, a side reaction with an electrolyte, and a decrease in lifespan characteristics of the electrode.

SUMMARY

The disclosed technology can be implemented in some embodiments to provide high-capacity anode for a lithium-ion battery in which volume expansion of a silicon-based active material is substantially suppressed, and a lithium-ion secondary battery including the same.

The disclosed technology can be implemented in some embodiments to provide an anode for a lithium-ion secondary battery having excellent adhesive force between a collector and an active material, the anode capable of improving resistance characteristics and lifespan characteristics of a battery, and a lithium-ion secondary battery including the same.

In an anode for a lithium-ion secondary battery, the anode includes a current collector, a first anode mixture layer formed on at least one surface of the current collector, and a second anode mixture layer formed on the first anode mixture layer. The first anode mixture layer and the second anode mixture layer include a carbon-based active material, respectively. The first anode mixture layer includes a first binder, a first silicon-based active material, and a first conductive material. The second anode mixture layer includes a second binder, a second silicon-based active material, and a second conductive material. Contents of the first conductive material and the second conductive material are different from each other with respect to the total combined weight of the first anode mixture layer and the second anode mixture layer. Types of the first silicon-based active material and the second silicon-based active material are different from each other.

The first silicon-based active material may include a silicon oxide-based active material. The second silicon-based active material may include a Si—C composite.

Types of the first binder and the second binder may be different from each other.

The second binder may include at least one of a polyacrylic acid (PAA)-based binder, a polyvinyl alcohol (PVA)-based binder, and a polyvinyl alcohol-polyacrylic acid (PVA-PAA) copolymer-based binder.

A content of a polyacrylic acid monomer in the polyacrylic acid (PAA)-based binder, a content of a polyvinyl alcohol monomer in the polyvinyl alcohol (PVA)-based binder, or a content of a polyvinyl alcohol-polyacrylic acid copolymer monomer in the polyvinyl alcohol-polyacrylic acid (PVA-PAA) copolymer binder may be 10 to 90 mol % with respect to the total content of each monomer.

A content of the first conductive material may be greater than a content of the second conductive material with respect to the total combined weight of the first anode mixture layer and the second anode mixture layer.

A content of the second silicon-based active material may be greater than a content of the first silicon-based active material with respect to the total combined weight of the first anode mixture layer and the second anode mixture layer.

A content ratio between the first silicon-based active material and the second silicon-based active material may be 1:9 to 4:6 with respect to the total combined weight of the first anode mixture layer and the second anode mixture layer.

The first binder may include styrene-butadiene rubber (SBR).

A content of a butadiene monomer in the styrene-butadiene rubber (SBR) may be 50 to 95 mol % with respect to the total content of the monomers.

Types of the first conductive material and the second conductive material may be different from each other.

A Raman R value may be represented by Equation 1 below.

A Raman R value of the first conductive material may be greater than or equal to a Raman R value of the second conductive material.

$$\text{Raman } R = I_D/I_G \qquad \text{[Equation 1]}$$

In Equation 1, $I_D$ may represent a peak intensity value in an absorption region of 1350 to 1380 $cm^{-1}$, and $I_G$ may represent a peak intensity value in an absorption region of 1580 to 1600 $cm^{-1}$.

The Raman R value of the first conductive material may be 0.1 to 1.8. The Raman R value of the second conductive material may be 0.01 to 0.1.

A loading weight (LW) ratio between the first anode mixture layer and the second anode mixture layer may be 2:8 to 5:5.

An adhesive force between the current collector and the first anode mixture layer may be 0.45 N/18 mm or more.

In some embodiments of the disclosed technology, a lithium-ion secondary battery includes the above-described anode for a secondary battery.

According to some embodiments of the disclosed technology, volume expansion of a silicon-based active material, included in an anode for a lithium-ion secondary battery, may be substantially suppressed, such that a lithium-ion secondary battery may have excellent capacity characteristics and lifespan characteristics.

According to some embodiments of the disclosed technology, there may be provided an anode for a lithium-ion secondary battery in which a process-related issue such as electrode deintercalation during notching, and issues, such as cracking and electrode deintercalation during a charging/discharging process after a battery is manufactured, are substantially alleviated, and a lithium-ion secondary battery including the same.

BRIEF DESCRIPTION OF DRAWINGS

Certain aspects, features, and advantages of the disclosed technology are illustrated by the following detailed description with reference to the accompanying drawings.

DETAILED DESCRIPTION

Features of the disclosed technology disclosed in this patent document are described by example embodiments with reference to the accompanying drawings.

The disclosed technology can be implemented in some embodiments to provide an anode for a secondary battery and a lithium-ion secondary battery including the same.

Hereinafter, preferred embodiments of the disclosed technology will be described. However, the embodiments of the disclosed technology can be modified in various forms, and the disclosed technology is not limited to the embodiments described below.

When a silicon-based active material is included for high-capacity characteristics of an anode for a lithium-ion secondary battery, issues may exist, such as electrode deintercalation due to large volume expansion rate and a reduction in lifespan characteristics. Accordingly, in the case of an anode including a silicon-based active material, it may be difficult to satisfy adhesive force between a current collector and an active material, resistance characteristics, and lifespan characteristics while securing high-capacity characteristics.

Figure 1:
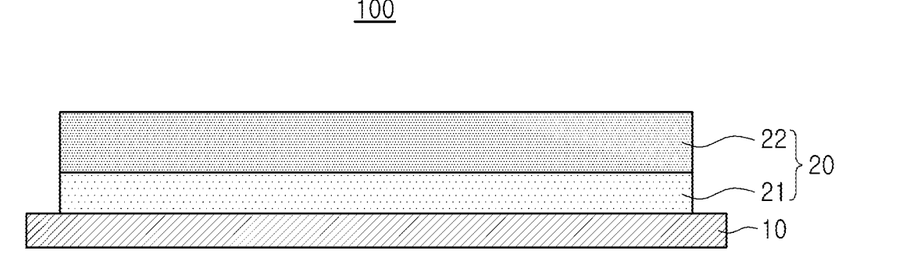
FIG. 1 is a schematic cross-sectional view of a structure of an anode for a lithium-ion secondary battery according to an embodiment of the disclosed technology.

Accordingly, the inventors of the disclosed technology have confirmed that the above issues may be substantially solved by appropriately adjusting a composition of each layer, in particular, a type of silicon-based active material included in each layer, a content of a conductive material, and a type of binder. Referring to FIG. 1, the disclosed technology will be described in more detail through embodiments below.

FIG. 1 is a schematic cross-sectional view of a structure of an anode for a lithium-ion secondary battery according to an embodiment of the disclosed technology.

Anode for Lithium-Ion Secondary Battery 100

An anode 100 for a lithium-ion secondary battery according to an embodiment of the disclosed technology includes a current collector 10, a first anode mixture layer 21 formed on at least one surface of the current collector, and a second anode mixture layer 22 formed on the first anode mixture layer. The first anode mixture layer and the second anode mixture layer respectively include a carbon-based active material, and the first anode mixture layer includes a first binder, a first silicon-based active material, and a first conductive material. The second anode mixture layer includes a second binder, a second silicon-based active material, and a second conductive material. Contents of the first conductive material and the second conductive material are different from each other with respect to the total combined weight of the first anode mixture layer and the second anode mixture layer. Types of the first silicon-based active material and the second silicon-based active material are different from each other.

The anode 100 for a secondary battery, having a multi-layer structure, may include an anode mixture layer 20 on a current collector 10, and the anode mixture layer may include a first anode mixture layer 21 and a second anode mixture layer 22.

The first anode mixture layer (lower layer) may be an active material layer on one surface adjacent to the current collector, and the second anode mixture layer (upper layer) may be an active material layer formed on the first anode mixture layer and relatively spaced apart from the current collector.

In the anode 100 for a secondary battery according to an embodiment of the disclosed technology, the first anode mixture layer (lower layer) and the second anode mixture layer (upper layer) may respectively include a first carbon-based active material and a second carbon-based active material, different types of silicon-based active materials. Accordingly, the contents of the first conductive material and the second conductive material, conductive materials included in each layer, may also be different from each other.

Types of the first silicon-based active material and the second silicon-based active material may be different from each other. Specifically, the first silicon-based active material may include a silicon oxide-based active material, and the second silicon-based active material may include a Si—C composite.

The silicon oxide-based active material may be a compound represented by the chemical formula of $SiO_x$ (0<x<2), and the Si—C composite may be a compound represented by the chemical formula of SiC.

In general, the Si—C composite may have high capacity and low resistance characteristics compared to a silicon oxide-based active material according to the related art. However, a short-circuit (isolation) may occur between the Si—C composite and a carbon-based active material due to structural collapse of an active material during a charging/discharging process.

Accordingly, when a silicon oxide-based active material, having relatively less structural collapse during a charging/discharging process, is applied to a first anode mixture layer (lower layer) formed on one surface adjacent to a current collector, an issue such as a short-circuit (isolation) between the carbon-based active material and the silicon oxide-based active material may be alleviated, unlike a case in which the Si—C composite is applied. In addition, the Si—C composite, having relatively high capacity and low resistance characteristics, may be applied to a second anode mixture layer (upper layer), thereby securing high energy density at the same time.

A content of the second silicon-based active material may be greater than a content of the first silicon-based active material with respect to the total combined weight of the first anode mixture layer and the second anode mixture layer.

A content ratio between the first silicon-based active material and the second silicon-based active material may be 1:9 to 4:6 with respect to the total combined weight of the first anode mixture layer and the second anode mixture layer.

The content of the first silicon-based active material may be 0.1 to 10 wt %, 0.5 to 5 wt %, or 1 to 3 wt % with respect to the total weight of the first anode mixture layer. The content of the sub-system active material may be 0.5 to 20 wt %, 1 to 10 wt %, or 4 to 10 wt % with respect to the total weight of the second anode mixture layer.

When the contents of the first silicon-based active material and the second silicon-based active material and a content ratio between the first silicon-based active material and the second silicon-based active material are as described above, a content of the silicon-based active material in the first anode mixture layer (lower layer) formed on a surface adjacent to a current collector may be adjusted to be relatively low, thereby alleviating an issue such as electrode deintercalation due to volume expansion. A content of the silicon-based active material, having low lithium-ion diffusion rate compared to a carbon-based active material, in the second anode mixture layer (upper layer) may be adjusted to be relatively high, thereby securing low-resistance characteristics and high-lifespan characteristics of an electrode.

The first binder may include a rubber-based binder. For example, the rubber-based binder may be at least one selected from the group consisting of styrene-butadiene rubber (SBR), fluorine-based rubber, ethylene propylene rubber, butyl acrylate rubber, butadiene rubber, isoprene rubber, acrylonitrile rubber, acrylic rubber, and silane-based rubber.

Specifically, the first binder may include styrene-butadiene rubber (SBR). In this case, adhesive force between a first anode mixture layer (lower layer) formed on one surface adjacent to a current collector, and the current collector may be further improved.

In the disclosed technology, the styrene-butadiene rubber (SBR) included in the first binder may represent a polymer including a repeating unit of a styrene-derived structure and a repeating unit of a butadiene-derived structure. In the styrene-butadiene rubber, the repeating unit of the butadiene-derived structure may be, for example, a repeating unit of a structure derived from 1,3-butadiene such as 1,3-butadiene, isoprene, 2,3-dimethyl-1,3-butadiene, or 2-ethyl-1,3-butadiene or a derivative thereof. In addition, the repeating unit of the styrene-derived structure may be a repeating unit of a structure derived from an aromatic vinyl-based compound, such as styrene, α-methylstyrene, p-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexyl naphthalene or a derivative thereof.

When the first binder is as described above, a multilayer electrode may have excellent flexibility and adhesive force, thereby substantially alleviating issues such as electrode deintercalation in a process, and cracking or electrode deintercalation during a charging/discharging process.

A content of a butadiene monomer in the styrene-butadiene rubber (SBR) may be 50 to 95 mol % with respect to the total content of the monomers.

When the content of the butadiene monomer in the styrene-butadiene rubber (SBR) is less than 50 mol % with respect to the total content of the monomers, adhesive force between a current collector and an active material layer may be low, such that an outermost punched surface may be peeled off when immersed in an electrolyte. When the content of the butadiene monomer in the styrene-butadiene rubber (SBR) is greater than 95 mol %, electrical resistance may be high and affinity with the electrolyte may be reduced, resulting in an increase in battery resistance.

The first anode mixture layer may further include a thickener. When the thickener is included in an anode mixture layer together with a binder, viscosity may be further imparted to further improve electrode adhesive force.

The thickener may include a cellulose-based compound, and for example, carboxymethyl cellulose (CMC), for example, one or more mixtures of carboxymethylcellulose (CMC), hydroxypropylmethylcellulose, methylcellulose, or alkali metal salts thereof. As the alkali metal, Na, K or Li may be used. Specifically, the thickener may include carboxymethylcellulose (CMC) or an alkali metal salt thereof.

The second binder may include water-soluble polymer-based binders such as rubber-based binders such as styrene-butadiene rubber (SBR), fluorine-based rubber, ethylene propylene rubber, butyl acrylate rubber, butadiene rubber, isoprene rubber, acrylonitrile rubber, acrylic rubber, and silane-based rubber, polyacrylic acid (PAA)-based binders, and polyvinyl alcohol-polyacrylic acid (PVA-PAA) copolymer-based binders, or combinations thereof. A detailed description of the rubber-based binder overlapping the above description will be omitted.

The second anode mixture layer may further include a thickener. The thickener may include a cellulose-based compound. A detailed description of the thickener is omitted because it overlaps with the above description.

Types of the first binder and the second binder may be different from each other.

Specifically, the first anode mixture layer (lower layer) may include a binder capable of improving flexibility and adhesive force of an electrode, and the second anode mixture layer (upper layer) may alleviate volume expansion of a silicon-based active material.

More specifically, the second binder may include at least one of a polyacrylic acid (PAA)-based binder, a polyvinyl alcohol (PVA)-based binder, and a polyvinyl alcohol-polyacrylic acid (PVA-PAA) copolymer-based binder. In this case, the second binder may not include a rubber-based binder and a thickener.

The above-described water-soluble polymer-based binders may have brittle characteristics having substantially less volume change, and may substantially alleviate volume expansion of a silicon-based active material when included together with the silicon-based active material.

Accordingly, unlike the first binder, when the second binder includes the same type of binder as above, adhesive force between the first anode mixture layer, an active material layer on one surface adjacent to a current collector, and a current collector may be improved, and flexibility of a multilayer electrode may be secured. In addition, a high-capacity anode for a lithium-ion secondary battery in which volume expansion is substantially alleviated even when a higher content of the silicon-based active material is applied to a second anode mixture layer on the first anode mixture layer.

A content of a polyacrylic acid monomer in the polyacrylic acid (PAA)-based binder, a content of a polyvinyl alcohol monomer in the polyvinyl alcohol (PVA)-based binder, or a content of a polyvinyl alcohol-polyacrylic acid copolymer monomer in the polyvinyl alcohol-polyacrylic acid (PVA-PAA) copolymer binder may be 10 to 90 mol % with respect to the total content of each monomer.

When a content of the monomer in the binder is less than 10 mol %, there is a limitation in substantially suppressing volume expansion of the silicon-based active material due to a low content of the monomer having brittle characteristics. Conversely, when the content of the monomer in the binder is greater than 90 mol %, the binder may have excessively increased brittleness characteristics, and there is a limitation in substantially suppressing cracking in the electrode.

The total content of the first binder and the thickener in the first anode mixture layer may be 0.2 to 7 wt %, 1.0 to 5.0 wt %, or 3.0 to 4.0 wt % with respect to the total weight of the first anode mixture layer.

Specifically, a content of the first binder may be 0.1 to 5 wt %, 0.7 to 3.3 wt %, or 2.0 to 2.5 wt % with respect to the total weight of the first anode mixture layer. When the first binder has an excessively low content, adhesive force may be low, resulting in deintercalation in a notching process. When the first binder has an excessively high content, electrical resistance may be high, resulting in a reduction in battery characteristics.

Specifically, a content of the thickener may be 0.1 to 2.0 wt %, 0.3 to 1.7 wt %, or 1.0 to 1.5 wt % with respect to the total weight of the first anode mixture layer. When the thickener has an excessively low content, adhesive force between active material layers may not be easily secured, resulting in scrap generation and partial deintercalation in a notching process. When the thickener has an excessively low content, electrical resistance may increase.

A content ratio of the first binder to the thickener in the first anode mixture layer may be 1 to 5, specifically, 1.5 to 3.

The total content of the second binder and the thickener in the second anode mixture layer may be 0.1 to 5 wt %, 0.5 to 4.0 wt %, or 1.0 to 3.0 wt % with respect to the total weight of the second anode mixture layer.

Specifically, a content of the second binder may be 0.07 to 3.5 wt %, 0.3 to 3.2 wt %, or 1.0 to 1.5 wt % with respect to the total weight of the second anode mixture layer. A content of the thickener may be 0.03 to 1.7 wt %, 0.15 to 1.6 wt %, or 0.5 to 0.7 wt % with respect to the total weight of the second anode mixture layer.

A content ratio of the second binder to the thickener in the second anode mixture layer may be 0.1 to 1, and specifically, 0.3 to 0.7.

As described above, when types of the first binder and the second binder are different, the thickener may not be present in the second anode mixture layer.

When specific contents of the first binder and the second binder are as described above, the multilayer electrode may have excellent flexibility and adhesive force, thereby substantially alleviating issues such as electrode deintercalation in a process, and cracking or electrode deintercalation during a charging/discharging process. The volume expansion of the silicon-based active material may be substantially alleviated due to brittle characteristics with substantially no change in volume.

Contents of the first conductive material and the second conductive material may be different from each other with respect to the total combined weight of the first anode mixture layer and the second anode mixture layer. Specifically, the content of the first conductive material may be greater than the content of the second conductive material with respect to the total combined weight of the first anode mixture layer and the second anode mixture layer.

The first conductive material may be 0.05 to 5 wt %, 0.1 to 3 wt %, or 0.3 to 1 wt % with respect to the total weight of the first anode mixture layer, and the second conductive material may be 0.01 to 1 wt %, 0.05 to 0.5 wt %, or 0.07 to 0.3 wt % with respect to the total weight of the second anode mixture layer.

When the contents of the first conductive material and the second conductive material are the same as described above, a content of a conductive material of a first anode mixture layer (lower layer) formed on one surface adjacent to a current collector may be adjusted to be relatively high, such that a contact point between the current collector and the first anode mixture layer may be increased. When the contact point is increased, resistance between an electrode and the current collector may be reduced. Even when the electrode is expanded during use, the contact point between the current collector and the electrode may be maintained. In addition, a content of a conductive material in a second anode mixture layer (upper layer) may be adjusted to be relatively low. Accordingly, a content of a conductive material included in the entire electrode may be reduced to secure economic feasibility, and a content of an active material in a mixture layer may be increased to implement an electrode having the same energy density with a relatively low loading weight. In addition, when an excessive amount of conductive material is included in the upper layer, a pore may be blocked, thereby alleviating an issue such as a reduction in interfacial resistance and lifespan characteristics of an electrode.

The first conductive material and the second conductive material may be used to impart conductivity to an electrode and to maintain a structure of the electrode. Any conductive material, not causing a side reaction with other elements of a secondary battery, may be used. For example, graphite such as natural graphite, or artificial graphite, a carbon-based material such as carbon black, acetylene black, Ketjen black, channel black, furnace black, lamp black, summer black, or a carbon fiber, a metal powder or metal fiber such as copper, nickel, aluminum, or silver, a conductive whisker such as zinc oxide or potassium titanate, a conductive metal oxide such as titanium oxide, or a conductive polymer such as a polyphenylene derivative may be used, and only one thereof or a mixture of two or more thereof may be used.

Specifically, the first conductive material and the second conductive material may include a carbon nanotube CNT, respectively.

The carbon nanotube CNT may have high electron mobility compared to carbon black, a conductive material according to the related art, to enable high energy density to be realized with a small amount of material, may have high intensity due to a stable structure thereof, and may substantially alleviate volume expansion of a silicon-based active material.

Accordingly, when the first conductive material and the second conductive material include the carbon nanotube CNT, energy density, lifespan characteristics, and resistance characteristics of the electrode may be more excellent.

The first conductive material and the second conductive material may be different from each other.

A Raman R value of the first conductive material may be greater than or equal to a Raman R value of the second conductive material.

A Raman R value is represented by Equation 1 below.

$$\text{Raman } R = I_D/I_G \quad \text{[Equation 1]}$$

In Equation 1, $I_D$ may represent a peak intensity value in an absorption region of 1350 to 1380 cm$^{-1}$, and $I_G$ may represent a peak intensity value in an absorption region of 1580 to 1600 cm$^{-1}$.

The Raman R value may be a parameter representing relative crystallinity of a material. A value of $I_D$ may represent a peak intensity of a region associated with an amorphous state, and A value of $I_G$ may represent a peak intensity of a region associated with a crystalline state. Accordingly, a higher Raman R value may represent a material having relatively low crystallinity.

The Raman R value of the first conductive material may be 0.1 to 1.8. Specifically, the Raman R value of the first conductive material may be 0.3 to 1.3.

The Raman R value of the second conductive material may be 0.01 to 0.1. Specifically, the Raman R value of the second conductive material may be 0.01 to 0.05.

The first conductive material may include a multi-walled carbon nanotube MWCNT, and the second conductive material may include a single-walled carbon nanotube SWCNT.

When properties such as the Raman R values of the first conductive material and the second conductive material are as described above, while maintaining an improved performance as a whole electrode by including a conductive material having relatively excellent performance such as conductivity in the second anode mixture layer (upper layer), it is possible to substantially alleviate problems caused by volume expansion and the like by including a conductive material having relatively low crystallinity to the first anode mixture layer (lower layer).

The first anode mixture layer and the second anode mixture layer may include a carbon-based active material, respectively.

The carbon-based active material may be one or more carbon-based active materials selected from among crystalline artificial graphite, crystalline natural graphite, amorphous hard carbon, low crystalline soft carbon, carbon black, acetylene black, Ketjen black, super P, graphene, and fibrous carbon.

The carbon-based active material may be 85 to 100 wt %, 90 to 97 wt %, or 93 to 95 wt % with respect to the total weight of the first anode mixture layer.

The carbon-based active material may be 80 to 100 wt %, 85 to 95 wt %, or 90 to 93 wt % with respect to the total weight of the second anode mixture layer.

A loading weight (LW) ratio between the first anode mixture layer and the second anode mixture layer may be 2:8 to 5:5.

The loading weight (LW) may represent an amount of an anode mixture layer, that is, a layer including an active material, a binder, and a conductive material, formed on a current collector, expressed in units of weight per area. In this case, the area may be based on an area of the current collector, and the weight may be based on a weight of the entire anode mixture layer formed.

A loading weight of the first anode mixture layer may be 10 to 20 $mg/cm^2$.

A loading weight of the second anode mixture layer may be 15 to 30 $mg/cm^2$.

When the loading weight (LW) ratio between the first anode mixture layer and the second anode mixture layer is as described above, a content of the second anode mixture layer may be controlled to be relatively high compared to the first anode mixture layer, thereby providing a multilayer anode having excellent capacity characteristics, lifespan characteristics, and electrode adhesive force.

In the anode for a lithium-ion secondary battery, an adhesive force between the current collector and the first anode mixture layer may be 0.45 N/18 mm or more. Specifically, the adhesive force between the current collector and the first anode mixture layer may be 0.5 to 1 N/18 mm, or 0.55 to 0.7 N/18 mm.

When the adhesive force between the current collector and the first anode mixture layer is as described above, the occurrence of an issue such as deintercalation after multiple charge/discharge cycles as well as in a process may be substantially suppressed due to the excellent adhesive force.

A method of preparing an anode for a secondary battery according to the disclosed technology is not particularly limited, and may be performed by a known method. For example, the anode may be prepared by applying and drying, on a current collector, a first anode slurry including a first solvent, a carbon-based active material, a first silicon-based active material, a first binder, and a first conductive material using a process such as bar coating, casting, or spraying to form a first anode mixture layer, and then applying and drying, on the first anode mixture layer, a second anode slurry including a second solvent, a carbon-based active material, a second silicon-based active material, a second binder, and a second conductive material by a method such as bar coating, casting, or spraying.

The solvent may be, for example, dimethyl sulfoxide (DMSO), isopropyl alcohol, N-methylpyrrolidone (NMP), acetone, or water. An amount of the solvent used may be sufficient as long as the solvent dissolves or disperses an active material, a conductive material, and a binder in consideration of a thickness of a composition applied to form an anode mixture layer and a preparation yield, and has viscosity capable of exhibiting excellent thickness uniformity during a subsequent application process for forming an anode mixture layer.

Lithium-Ion Secondary Battery

A lithium-ion secondary battery according to an embodiment of the disclosed technology may include the anode for a secondary battery described above.

The lithium-ion secondary battery may include a cathode including a lithium-transition metal composite oxide. Specifically, the lithium-transition metal composite oxide may be an NCM-based cathode active material represented by the chemical formula of $Li_xNi_aCo_bMn_cO_y$ ($0<x\le1.1$, $2\le y\le2.02$, $0<a<1$, $0<b<1$, $0<c<1$, $0<a+b+c\le1$). In addition, the lithium-transition metal composite oxide may be a lithium iron phosphate (LFP)-based cathode active material represented by the chemical formula $LiFePO_4$.

The lithium-ion secondary battery as described above may have excellent high-capacity characteristics, lifespan characteristics, and resistance characteristics, and thus may be highly useful as a power source for electric vehicles (EVs) and hybrid electric vehicles (HEVs).

Hereinafter, examples are provided to assist in understanding of the disclosed technology. However, the examples are merely illustrative of the disclosed technology and do not limit the scope of the appended claims. It will be apparent to those skilled in the art that various changes and modifications could be made to the examples within the scope and spirit of the disclosed technology, and are also within the scope of the appended claims.

Example and Comparative Example

1) Preparation of Anode

A first anode mixture layer was formed by applying and drying a first anode slurry on a copper foil, and a second anode mixture layer was formed by applying and drying a second anode slurry on the first anode mixture layer, thereby preparing anodes for a lithium-ion secondary battery of Examples and Comparative Examples. In this case, a loading weight (LW) ratio between the first anode mixture layer and the second anode mixture layer was applied as 5:5.

In addition, Table 1 below shows types and contents of a first silicon-based active material, a second silicon-based active material, a first conductive material, a second conductive material, a first binder, and a second binder applied to the Examples and the Comparative Examples. Artificial graphite was applied as a remaining carbon-based active material included in the first anode mixture layer and the second anode mixture layer. In addition, a polyacrylic acid (PAA)-based binder having a polyacrylic acid (PAA) monomer having a content of 40 mol % in the binder was applied as a second binder of Example 1.

2) Manufacturing of Secondary Battery

A cathode was prepared by applying and drying a slurry including an NCM-based active material, a Li-transition metal composite oxide, on an aluminum foil, and a lithium-ion secondary battery was manufactured by interposing a polyolefin separator between the cathode and the anode prepared above, and injecting an electrolyte in which 1 M of LiPF$_6$ was dissolved in a solvent containing a mixture of ethylene carbonate (EC) and diethyl carbonate (DEC). The manufactured lithium-ion secondary battery was applied as secondary battery samples of the Examples and the Comparative Examples.

4) Evaluation of Resistance Characteristics

The resistance characteristics of the secondary battery sample were measured by discharging the secondary battery sample with a current of 1 C for 10 seconds after a rest period of 1 hour at a state of charge (SOC) of 50% at 25° C., and results thereof are shown in Table 2. Specifically, a resistance value of the secondary battery sample was measured according to the following Equation 2, and results thereof are shown in Table 2.

$$R=(V_0-V_1)/I \qquad \text{[Equation 2]}$$

In Equation 2, R represents a resistance value of a secondary battery, $V_0$ represents a voltage of a secondary battery measured after a rest period of 1 hour at an SOC of 50% at 25° C., $V_1$ represents a voltage of a secondary battery measured after discharging the second battery with a current of 1 C for 10 seconds, and I represents a value of a current of 1 C.

5) Evaluation of Lifespan Characteristics

After repeating 300 cycles of charging the secondary battery sample at an SOC of 4 to 98% with a current of ⅓ C and discharging the secondary battery sample with a current of 0.5 C at 25° C., a discharge capacity retention rate of the secondary battery sample compared to an initial discharge capacity of the secondary battery sample was measured as a percentage, and results thereof are shown in Table 2.

TABLE 1

| | Second anode mixture layer (upper layer) | | | First anode mixture layer (lower layer) | | |
|---|---|---|---|---|---|---|
| | Second silicon-based active material | Second conductive material | Second binder/ Thickener | First silicon-based active material | First conductive material | First binder/ Thickener |
| Example 1 | SiC 7% | SWCNT 0.1% | PAA 1.7% | SiOx 2% (0 < x < 2) | MWCNT 0.5% | SBR 2.4% CMC 1.2% |
| Example 2 | SiC 7% | SWCNT 0.1% | SBR 0.6% CMC 1.2% | SiOx 2% (0 < x < 2) | MWCNT 0.5% | SBR 2.4% CMC 1.2% |
| Comparative Example 1 | SiC 7% | SWCNT 0.1% | SBR 0.6% CMC 1.2% | SiOx 2% (0 < x < 2) | MWCNT 0.1% | SBR 2.4% CMC 1.2% |
| Comparative Example 2 | SiC 7% | MWCNT 0.5% | PAA 1.7% | SiOx 2% (0 < x < 2) | MWCNT 0.5% | SBR 2.4% CMC 1.2% |
| Comparative Example 3 | SiOx 14% (0 < x < 2) | SWCNT 0.1% | SBR 0.6% CMC 1.2% | SiOx 2% (0 < x < 2) | MWCNT 0.5% | SBR 2.4% CMC 1.2% |
| Comparative Example 4 | SiOx 14% (0 < x < 2) | SWCNT 0.1% | SBR 0.6% CMC 1.2% | SiOx 2% (0 < x < 2) | MWCNT 0.1% | SBR 2.4% CMC 1.2% |

3) Evaluation of Adhesive Force

After cutting the anode prepared above into a size of 18 mm in width and 150 mm in length, a tape having a width of 18 mm was attached to a current collector and was sufficiently adhered using a roller having a load of 2 kg. Thereafter, an anode mixture layer was adhered to one side of a tensile tester (DS2-50N made by IMADA company) using a double-sided tape, and then the adhesive force thereof was measured by fastening the tape attached to the current collector to the opposite side of the tensile tester. Results thereof are shown in Table 2.

TABLE 2

| | Electrode adhesive force (N/18 mm) | Resistance characteristics (mΩ) | Lifespan characteristics (%) |
|---|---|---|---|
| Example | 0.57 | 0.85 | 98.5 |
| Example 2 | 0.56 | 0.88 | 97.1 |
| Comparative Example 1 | 0.41 | 1.05 | 94.6 |
| Comparative Example 2 | 0.56 | 0.95 | 88.0 |
| Comparative Example 3 | 0.42 | 0.89 | 96.2 |

TABLE 2-continued

| | Electrode adhesive force (N/18 mm) | Resistance characteristics (mΩ) | Lifespan characteristics (%) |
|---|---|---|---|
| Comparative Example 4 | 0.40 | 1.10 | 88.8 |

When comparing Examples 1 and 2 with Comparative Examples 1 to 4, it was found that anodes of Examples 1 and 2, in which a content of a first conductive material and a content of the second conductive material are different from each other, and types of the first silicon-based active material and the second silicon-based active material have different characteristics, had excellent electrode adhesive force compared to anodes of Comparative Examples 1 to 4, and also had excellent resistance characteristics and lifespan characteristics.

Among the anodes, the anode of Example 1 in which the first binder and the second binder also have different characteristics was found to be most excellent in terms of adhesive force, resistance characteristics, and lifespan characteristics.

Considering the above results, when, in a multilayer anode including a silicon-based active material, contents of conductive materials of the upper layer and the lower layer and types of silicon-based active materials of the upper layer and the lower layer are different from each other as in Examples 1 and 2, it may be determined that it is possible to provide an anode having excellent capacity and lifespan characteristics and a secondary battery including the same by manufacturing an electrode suitable for characteristics required for each layer.

In addition, when different types of binders are respectively applied to layers to suit the characteristics required for each layer, as in Example 1, it may be determined that it is possible to provide an anode having more excellent performance and a lithium-ion secondary battery including the same.

Only specific examples of implementations of certain embodiments are described. Variations, improvements and enhancements of the disclosed embodiments and other embodiments may be made based on the disclosure of this patent document.

What is claimed is:

1. An anode for a lithium-ion secondary battery, the anode comprising:
   a current collector;
   a first anode mixture layer formed on at least one surface of the current collector; and
   a second anode mixture layer formed on the first anode mixture layer,
   wherein the first anode mixture layer and the second anode mixture layer include a carbon-based active material, respectively,
   the first anode mixture layer includes a first binder, a first silicon-based active material, and a first conductive material,
   the second anode mixture layer includes a second binder, a second silicon-based active material, and a second conductive material,
   contents of the first conductive material and the second conductive material are different from each other with respect to the total combined weight of the first anode mixture layer and the second anode mixture layer,
   types of the first silicon-based active material and the second silicon-based active material are different from each other, and
   the first silicon-based active material includes a silicon oxide-based active material, and
   the second silicon-based active material includes a Si—C composite.

2. The anode of claim 1, wherein types of the first binder and the second binder are different from each other.

3. The anode of claim 2, wherein the second binder includes at least one of a polyacrylic acid (PAA)-based binder, a polyvinyl alcohol (PVA)-based binder, and a polyvinyl alcohol-polyacrylic acid (PVA-PAA) copolymer-based binder.

4. The anode of claim 3, wherein a content of a polyacrylic acid monomer in the polyacrylic acid (PAA)-based binder, a content of a polyvinyl alcohol monomer in the polyvinyl alcohol (PVA)-based binder, or a content of a polyvinyl alcohol-polyacrylic acid copolymer monomer in the polyvinyl alcohol-polyacrylic acid (PVA-PAA) copolymer binder is 10 to 90 mol % with respect to the total content of each monomer.

5. The anode of claim 1, wherein a content of the first conductive material is greater than a content of the second conductive material with respect to the total combined weight of the first anode mixture layer and the second anode mixture layer.

6. The anode of claim 1, wherein a content of the second silicon-based active material is greater than a content of the first silicon-based active material with respect to the total combined weight of the first anode mixture layer and the second anode mixture layer.

7. The anode of claim 6, wherein a content ratio between the first silicon-based active material and the second silicon-based active material is 1:9 to 4:6 with respect to the total combined weight of the first anode mixture layer and the second anode mixture layer.

8. The anode of claim 1, wherein the first binder includes styrene-butadiene rubber (SBR).

9. The anode of claim 8, wherein a content of a butadiene monomer in the styrene-butadiene rubber (SBR) is 50 to 95 mol % with respect to the total content of the monomers.

10. The anode of claim 1, wherein types of the first conductive material and the second conductive material are different from each other.

11. The anode of claim 1, wherein
   a Raman R value is represented by Equation 1 below,
   a Raman R value of the first conductive material is greater than or equal to a Raman R value of the second conductive material, and $$\text{Raman } R = I_D/I_G \qquad \text{[Equation 1]}$$

In Equation 1, $I_D$ represents a peak intensity value in an absorption region of 1350 to 1380 cm$^{-1}$, and $I_G$ represents a peak intensity value in an absorption region of 1580 to 1600 cm$^{-1}$.

12. The anode of claim 11, wherein
   the Raman R value of the first conductive material is 0.1 to 1.8, and
   the Raman R value of the second conductive material is 0.01 to 0.1.

13. The anode of claim 1, wherein a loading weight (LW) ratio between the first anode mixture layer and the second anode mixture layer is 2:8 to 5:5.

14. The anode of claim 1, wherein an adhesive force between the current collector and the first anode mixture layer is 0.45 N/18 mm or more.

15. A lithium-ion secondary battery comprising: an anode for a secondary battery of claim 1.

* * * * *